Jan. 26, 1971 C. H. CURRIE ET AL 3,559,074

REMOTE LOCAL OSCILLATOR FREQUENCY MULTIPLIER

Filed Feb. 7, 1968 2 Sheets-Sheet 1

INVENTORS
CHARLES H. CURRIE
BY WILLIAM W. GRAHAM
Cushman, Darby & Cushman
ATTORNEYS

REMOTE LOCAL OSCILLATOR FREQUENCY MULTIPLIER

Filed Feb. 7, 1968

INVENTORS
CHARLES H. CURRIE
BY WILLIAM W. GRAHAM
Cushman, Darby & Cushman
ATTORNEYS 3,559,074

REMOTE LOCAL OSCILLATOR FREQUENCY MULTIPLIER

Charles H. Currie and William W. Graham, Doraville, Ga., assignors to Scientific-Atlanta, Incorporated, Atlanta, Ga., a corporation of Georgia Filed Feb. 7, 1968, Ser. No. 703,579
Int. Cl. H04b *3/56*
U.S. Cl. 325—445 8 Claims

ABSTRACT OF THE DISCLOSURE

The following specification discloses a remote local oscillator frequency multiplier for use in combination with a microwave antenna receiver apparatus wherein the remote local oscillator and IF preamplifier are located at a point remote from the crystal mixer, which may be in the form of a cross-guide harmonic mixing apparatus, to increase the sensitivity of such receivers. The frequency multiplier, which is located adjacent the mixing apparatus, includes a frequency selective T for coupling the local oscillator signal to a broad band frequency multiplier and the intermediate frequency signal and the crystal current from the mixer back to the IF preamplifier. The signal from the frequency multiplier is connected to the mixer through a high-pass filter, which may be a wave guide having dimensions beyond cut-off for the fundamental local oscillator signal and any harmonics below the desired frequency to be connected to the mixer.

The invention described herein was made in the performance of work under a NASA contract and is subject to the provisions of Section 305 of the National Aeronautics and Space Act of 1958, Public Law 85-568 (72 Stat. 435; 42 U.S.C. 2457).

The present invention relates to receivers for antenna measurements and, more particularly, to receivers of the type wherein the local oscillator is located remote from the mixer apparatus, which is normally mounted in the vicinity of the antenna.

In antenna measurement receivers of this type for microwave signals, transmission line losses and mixer conversion losses are critical and become most severe for signals in the millimeter and shorter wave length range. In addition to these losses, which have a direct effect on the signal-to-noise ratio and sensitivity, this type of receivers suffers from the further requirement that the local oscillator signal generator must be accurately and easily tuneable over a substantial range. It is also desirable to have substantial local oscillator signal power to increase sensitivity without having substantial noise introduced, due to the higher power of the local oscillator signal.

The present invention provides an antenna measurement receiver which maintains transmission losses and mixer conversion losses at a minimum and also permits the use of high local oscillator power and at the same time employs an accurately and easily tuneable local oscillator. In addition, the receiver apparatus is designed such that only a single coaxial cable is required to couple the local oscillator signal from the remote local oscillator to the mixer and IF signal and crystal current from the mixer to the receiver which includes the local oscillator.

In accordance with the present invention, the mixer apparatus, located at the base of the antenna, is coupled with what is hereinafter referred to as a remote local oscillator (L.O.) frequency multiplier. This remote local oscillator frequency multiplier comprises a frequency selective T and a broad band frequency multiplier. One input to the frequency selective T comprises the coaxial cable connection of the remotely located low frequency L.O signal which passes through the frequency selective T to the broad band frequency multiplier wherein the local oscillator signal is multiplied by a factor such as 3, 4 or 5 and then passed through a high pass filter to eliminate the fundamental component of the local oscillator signal as well as any unwanted harmonics. From the high pass filter the multiplied signal is fed to the mixer apparatus wherein the signal from the antenna and the multiplied local oscillator signal are mixed in the mixer diode. In this manner the harmonic number is reduced by a factor equal to the multiplier factor with the resulting decrease in conversion loss. Also, by filtering out the fundamental frequency as well as harmonics below the desired multiplied L.O. signal frequency, the power of the L.O. signal injected into the mixer may be increased without increasing the noise level above that which would be experienced if the filter were not employed or if the fundamental L.O. signal frequency were directly connected to the mixer. Thus, by filtering and increasing the L.O. signal power, the loss in the multiplier can be offset by the gain in sensitivity due to the increased signal power and therefore the sensitivity of the receiver is improved by the decrease in the losses occurring in the mixer. The intermediate frequency signal and the DC crystal current are connected via a coaxial cable to the other input of the frequency selective T and passes therethrough to the coaxial cable connection which also carries the low frequency local oscillator signal. The intermediate frequency signal and the crystal current are thus conveyed over the coaxial cable to the IF preamplifier section of the receiver.

By multiplying the local oscillator signal in the remote local oscillator frequency multiplier, filtering out the fundamental and unwanted harmonics and then employing harmonic mixing techniques in the mixer, the conversion loss experienced in the mixer is substantially reduced and the loss due to multiplication is offset by the ability to increase the L.O. signal power. Thus, the sensitivity of the mixer is improved and the transmission losses are reduced due to the low frequency of the local oscillator signal.

In addition, by the use of the frequency selective T, a single coaxial cable may be employed to connect both the local oscillator signal to the mixing apparatus and also to convey the intermediate frequency signal and crystal current back to the receiver since the frequency differences in these signals allow for adequate isolation in the frequency selective T, efficient operation of the receiver and prevents undesirable interference. By employing a relatively long coaxial cable between the local oscillator and IF section and the frequency selective T, the local oscillator may be located remotely from the antenna and thus does not suffer from design considerations required of local oscillators located in the vicinity of the antenna, a fact which enables the oscillator to be designed to be easily tuneable. In addition, the use of a low frequency oscillator, enabled by the concurrent use of a frequency multiplier, not only reduces transmission losses in the cable connecting the L.O. signal to the mixer-multiplier, but also enables tuning, over a wide range of frequencies, of the oscillator.

The present invention may be better understood by referring to the following detailed description of a preferred embodiment along with the attached drawings in which.

Figure 1:
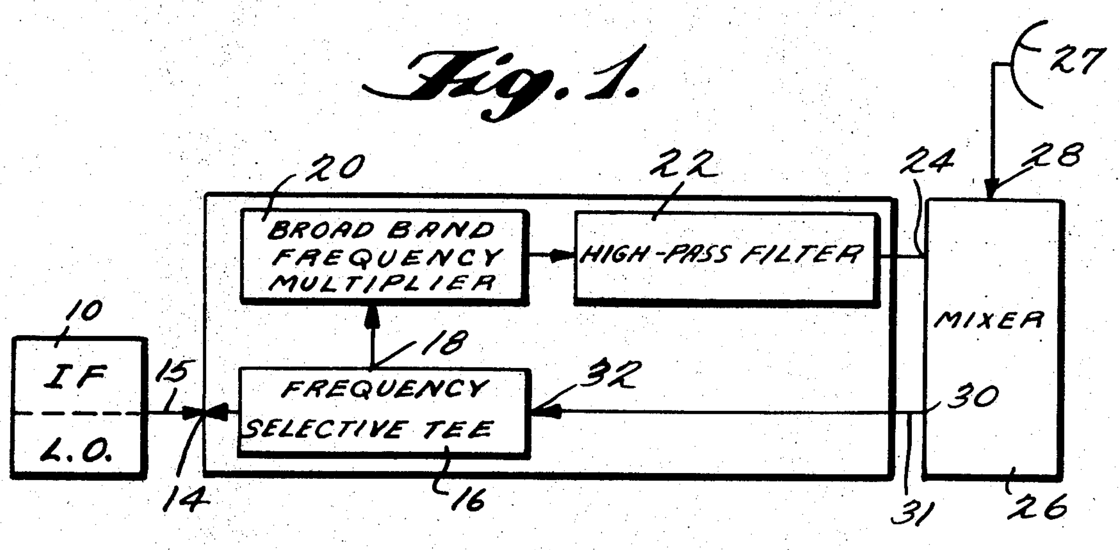
FIG. 1 is a block diagram of the elements of a preferred embodiment of the present invention.

Referring now to FIG. 1, the receiving apparatus, containing the local oscillator and the other necessary components including the IF preamplifier stages, is schematically represented by the block 10. The local oscillator may be of any suitable construction capable of operation in the desired frequency range. The signal from the local oscillator is connected by a coaxial cable 15 to port 14 of the frequency selective T 16 which is shown in greater detail in FIG. 2. The local oscillator signal passes through the frequency selective T and out port 18 to the broad band frequency multiplier 20 wherein the fundamental local oscillator frequency is multiplied by a factor of 3, 4 or any desired multiplication factor, which is determined by the operating characteristics of the mixer, the frequency of the antenna signal, the L.O. signal and the desired IF frequency. From the broad band frequency multiplier, the multiplied local oscillator signal is fed to the high pass filter 22 wherein the fundamental local oscillator signal as well as any unwanted harmonics below the desired harmonic are eliminated and the resulting high frequency local oscillator signal is then connected to the local oscillator input 24 of the mixer 26. The signal from the antenna 27 is connected to the mixer at input 28 and the resulting intermediate frequency signal and DC crystal current (when a mixer diode is employed) are obtained at the output terminal 30. A suitable coaxial cable 31 connects the IF signal and crystal current to the input port 32 of the frequency selective T 16. The frequency selective T is effective to pass the signals at input 32 to the input coaxial cable 15 which, in turn, connects the IF and crystal current to the receiver 10. Due to the difference in frequency of the local oscillator signal and the IF signal from the mixer and the DC crystal current, the frequency selective T is effective to isolate the L.O. signal from input 32 and the IF signal from port 18. The single coaxial cable 15 is thus effective to transmit the L.O. signal to the multiplier-mixer and the IF signal and crystal current to the receiver.

Figure 2:
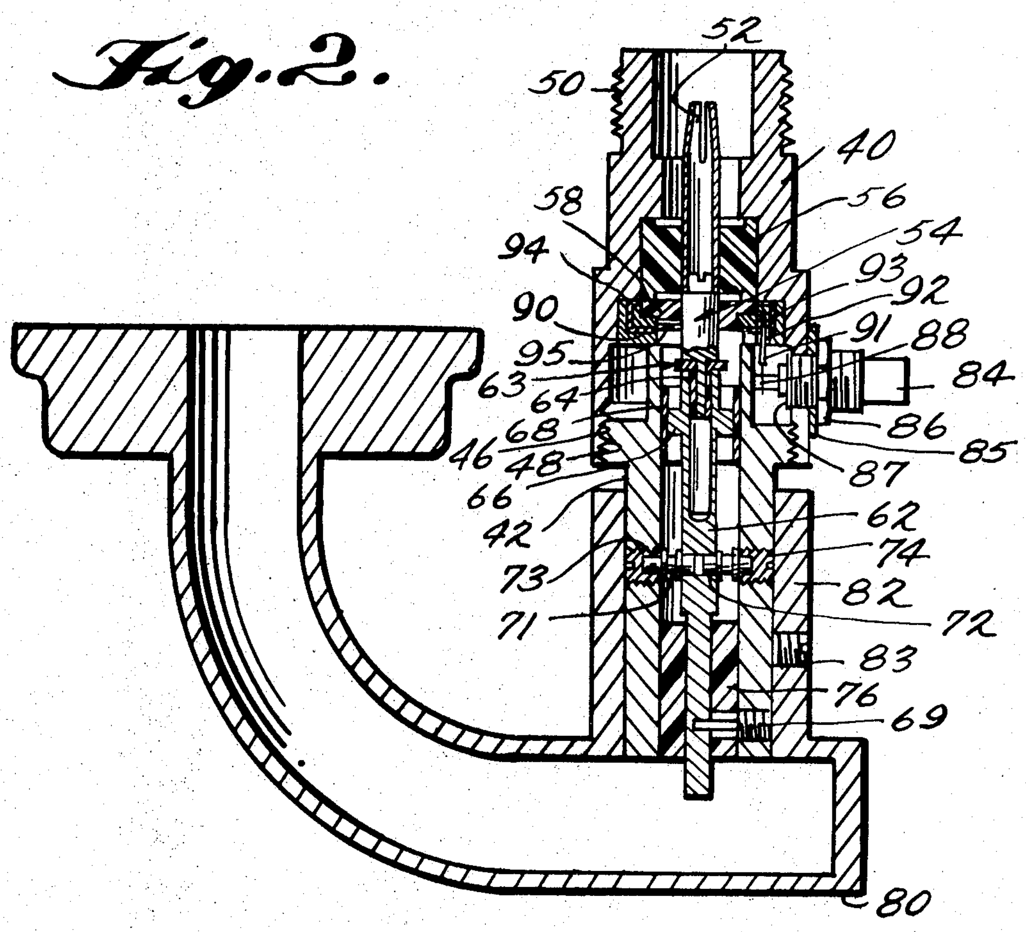
FIG. 2 illustrates the remote local oscillator frequency multiplier.

The preferred embodiments of the frequency selective T 16, the frequency multiplier 20 and the high pass filter 22 are shown in greater detail in FIG. 2.

The frequency selective T and the multiplier are contained within, and are part of, the housing 40 and housing 42 which are secured together by screw threaded portions 46 and 48. The upper end of housing 40 comprises a threaded annular flange 50 which forms the connector input terminal for the coaxial cable 15 from the receiver. The pin assembly 52 connects with the center conductor of the coaxial cable 15 in a conventional manner.

The pin assembly is conductively secured to plunger 54 and both are secured within housing 40 by suitable annular insulators 56 and 58.

The plunger 54 is journaled within the center conductor 62 and held in spaced relation thereto by spacers 63 and a Teflon insulating ring 64. The center conductor 62 is formed with a flange or enlarged portion 66 which is insulated from housing 42 by insulating ring 68. The enlarged portion 66 of the center conductor is effective as a low frequency choke, in accordance with well known transmission theory, and isolates or prevents the lower frequency IF signal from passing down the center conductor 62.

Diodes 71 and 72, which constitute the multiplier 20 (FIG. 1), are mounted in housing 42 by crystal holders 73 and 74, respectively, and are disposed in contact with the center conductor 62. The diodes 71 and 72 function to rectify the local oscillator signal and thereby create harmonics. The center conductor 62 is further supported by the annular insulator 76 and extends into the wave guide 80 to form a coaxial-to-wave guide coupling. Screw-threaded member 69 constitutes a DC return path.

The wave guide 80 serves to connect the multiplied L.O. signal to the mixer and also as the filter 22 (FIG. 1). It is to be understood, however, that other and different transmission lines and filters may be used instead of the wave guide 80. The housing 42 is slidably mounted in the annular flange 82 of the wave guide and is retained therein by set screw 83. The dimensions of the wave guide 80 are such that it represents a wave guide beyond cut-off filter to the fundamental L.O. signal and harmonic frequencies below the selected harmonic frequency. Higher order harmonics are 10 db or more below the selected harmonic and therefore need not be filtered out.

The coaxial connector 84 constitutes the port 32 of the frequency selective T and is adapted to receive the coaxial cable 31 from the mixer 26. The connector 84 is secured to the housing 40 by washer 85, nut 86 and flange 87.

The center pin 88 of the connector 84 is connected to a conductive ring member 90 by a lead 91, which passes through an aperture 92 in by-pass plate 93. The lead 91 is insulated to prevent contact with the plate 93. The conductive ring 90 is insulated from the housing 40 and by-pass plate 93 by a suitable insulator such as Teflon, as indicated at 94, and is electrically connected to the plunger 54 by a lead 95. The aperture 92 in combination with the lead 91 form an effective short for frequencies in range of the L.O. signal but not for the IF signal and thereby effectively isolate the L.O. signal from the IF input.

The latter described structures in combination with the flange 66 which forms a low frequency choke comprise the frequency selective T 16 shown in FIG. 1.

Figure 4:
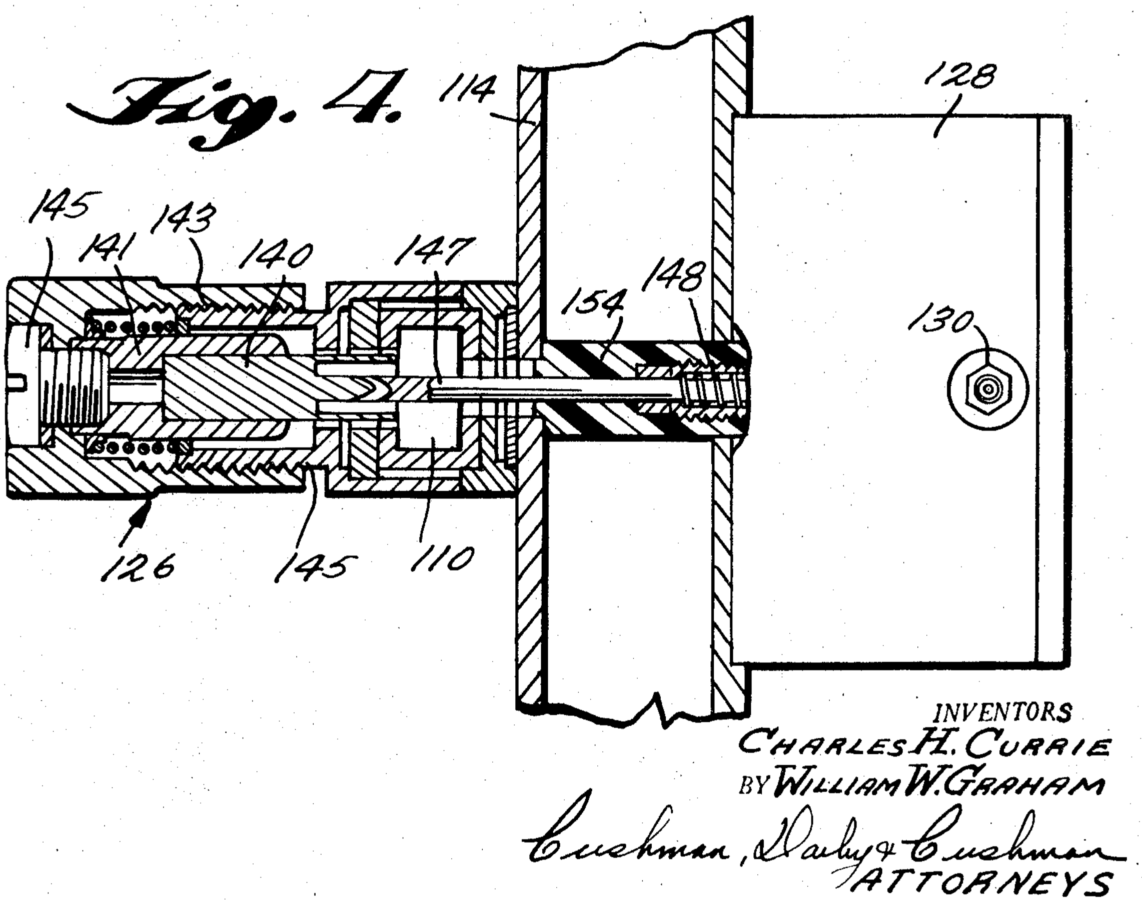
FIG. 4 is a cross-sectional view of the mixer shown in FIG. 3.

The preferred mixer structure is shown in FIG. 4 and is particularly adapted for use with antenna signals in the millimeter wavelength range (20–100 gHz.) and a local oscillator input frequency in the X-band (8.2–12.4 gHz.). These frequency ranges are only examples and it is to be understood that the present invention is not limited thereto. Similarly, the present invention is not limited to the particular mixer described herein and may, for example, be a "balanced" type mixer.

Figure 3:
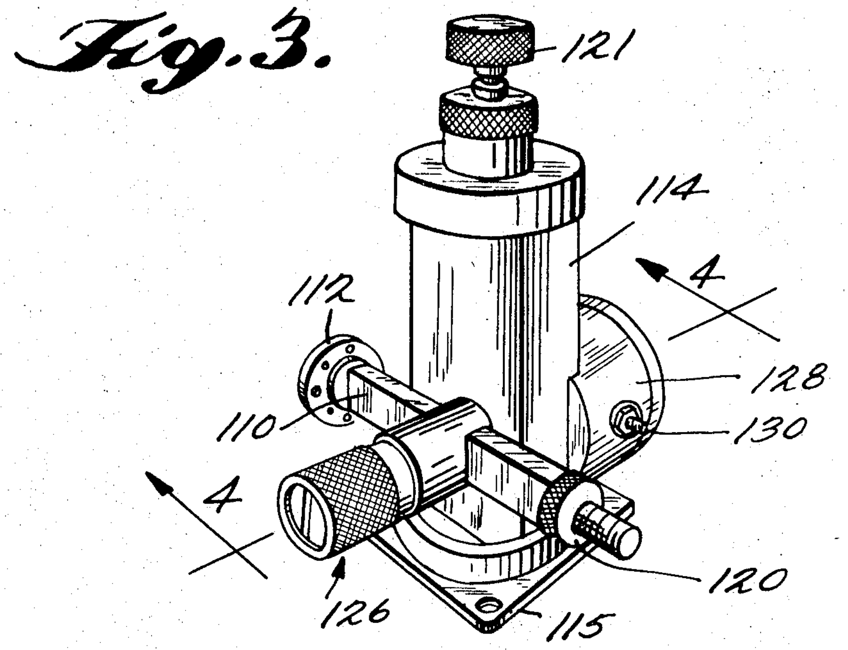
FIG. 3 illustrates a preferred form of the mixer apparatus suitable for use in accordance with the teachings of the present invention.

The mixer shown in FIG. 3 is generally referred to hereinafter as a cross-guide mixer, i.e., a mixer wherein the antenna signal and L.O. signal are propagated in wave guides arranged perpendicular to each other and wherein the mixer crystal and center conductor pass through each wave guide.

In FIG. 3, the millimeter wave guide 110 is adapted to be coupled to the antenna at 112. The X-band wave guide 114 is similarly adapted to be coupled to the wave guide filter 80 shown in FIG. 2 at 115. The millimeter wave guide 110 and the X-band wave guide 114 are both provided with adjusting knobs 120 and 121 for tuning the respective wave guides by varying the position of a shorting plunger within each wave guide (not shown) in a well-known manner.

The mixer crystal position is controlled by knob 126 and the housing portion 128 contains an IF impedance matching network (not shown) to match the crystal impedance to the impedance of the coaxial line 31 connected to connector 130. Line 31 connects the IF signal and crystal current to the connector 84 shown in FIG. 2. The preferred impedance matching network is an artificial transmission line comprising an L-C network, which may contain variable components to effect the selection of the desired intermediate frequency and the impedance matching function. The frequency selection may, of course, be accomplished in the IF section of the receiver.

In FIG. 4 there is shown a partial cross-section of the millimeter harmonic cross-guide mixer shown in FIG. 3, taken through the crystal holder. The crystal 140 is mounted in a holder 141 within housing 143. The crystal is vertically adjustable by the rotation of housing 143 which is threadably mounted on frame 145. The crystal is rotated by turning screw 145.

The center conductor 147 is held in positive contact with the crystal by spring 148, and extends from the crystal through the millimeter wave guide 110, the X-band wave guide 114, and coupled to the IF impedance matching network in housing 128. The center conductor is mounted in an insulating material 154 such as Teflon in order to prevent harmful effects of vibration and shock.

In the preferred embodiment, it has already been suggested that the antenna signal range is 26.5–100 gHz. and the L.O. signal input is in the range of 8.2–12.4 gHz. In addition, it is also preferable to operate the local oscillator in the receiver 10 in the S-band, i.e., 2–4 gHz., in order to keep the transmission losses, due to skin-effect and the like, as low as possible. As an example of intermediate frequency values, the present invention has been operated in combination with receivers operating on 45 mHz. and 65 mHz.

In this particular example, it can be seen that by using a multiplication factor of 3, i.e., the second harmonic of the L.O. signal, the loss in the mixer can be reduced by approximately 9 db. There is, of course, still a multiplication loss, however, it has been found that due to the filtering of the frequencies below the desired multiplied frequency, the power of the L.O. signal can be increased without a concurrent substantial increase in the signal-to-noise ratio, to thus offset the multiplication losses. Thus, a more sensitive receiver is achieved. In addition, the novel multiplier T mixer combination as shown in FIGS. 2–4 provide an extremely rugged yet adjustable and compact unit which is particularly significant in view of the fact that these components must be mounted in the antenna structure and consequently experience severe vibration and physical shock.

It will be apparent from the foregoing to those skilled in the art that this invention is amenable to a variety of modifications with respect to mechanical components, circuitry and electrical components and hence may be given embodiments other than those particularly illustrated and described herein without departing from the essential features of the present invention and within the scope of the claims appended hereto.

What is claimed is:

1. In antenna signal receiver apparatus of the type wherein the local oscillator and IF section of said receiver are located at a point remote from the mixer means and coupled thereto by a single transmission line, the improvement comprising:

multiplier means located at the position of said mixer means, means including said single transmission line for connecting the signal from said local oscillator to said multiplier means, high pass filter means for connecting the multiplied local oscillator signal from said multiplier means to said mixer means wherein said filtered and multiplied local oscillator signal is mixed with signal from said antenna to produce an intermediate frequency signal and a crystal current, and means including said single transmission line for coupling said intermediate frequency signal and crystal current from said mixer to the remotely located IF section of said receiver, said means for connecting said local oscillator signal to said multiplier means and said means for connecting said IF signal to said IF section including a frequency selective T having first, second and third ports, said single cable transmission line being coupled to said first port, means for coupling said second port to said multiplier means and means for coupling said IF signal and crystal current from mixer means to said third port, said frequency selective T being effective to isolate said local oscillator signal from said third port and said IF signal and crystal current from said second port.

2. In antenna signal receiver apparatus of the type wherein the local oscillator and IF section of said receiver are located at a point remote from the mixer means and coupled thereto by a single transmission line, the improvement comprising:

multiplier means located at the position of said mixer means, means including said single transmission line for connecting the signal from said local oscillator to said multiplier means, high pass filter means comprising a wave guide having dimensions beyond cut-off for frequencies less than the desired multiplied local oscillator frequency for connecting the multiplied local oscillator signal from said multiplier means to said mixer means wherein said filtered and multiplied local oscillator signal is mixed with signal from said antenna to produce an intermediate frequency signal and a crystal current, and means including said single transmission line for coupling said intermediate frequency signal and crystal current from said mixer to the remotely located IF section of said receiver.

3. In antenna signal receiver apparatus of the type wherein the local oscillator and IF section of said receiver are located at a point remote from the mixer means and coupled thereto by a single transmission line, the improvement comprising:

mixer means comprising a cross-guide harmonic mixer having and IF and crystal current output terminal, said cross-guide harmonic mixer comprising a first wave guide section for propagating the antenna signal, a second wave guide section for propagating said multiplied local oscillator signal, said first and second wave guides being disposed perpendicularly to each other, crystal mixing means arranged to pass through said first and second wave guides and means for coupling a predetermined intermediate frequency signal and crystal current generated in said crystal mixing means to said output terminal, multiplier means located at the position of said mixer means, means including said single transmission line for connecting the signal from said local oscillator to said multiplier means, high pass filter means for connecting the multiplied local oscillator signal from said multiplier means to said mixer means wherein said filtered and multiplied local oscillator signal is mixed with signal from said antenna to produce an intermediate frequency signal and a crystal current, and means including said single transmission line for coupling said intermediate frequency signal and crystal current from said mixer to the remotely located IF section of said receiver.

4. A remote local oscillator frequency multiplier adapted for use in combination with an antenna receiver system of the type wherein the local oscillator and IF sections are located at point remote from the intermediate frequency producing mixer and coupled thereto by a single coaxial cable, said remote local oscillator frequency multiplier comprising:

a frequency selective T having first port, a second port and a third port, said first port being adapted to be coupled to said single coaxial cable, said third port being adapted to receive the intermediate frequency signal from the mixer of said antenna receiver, a frequency multiplier having an input and an output, means for coupling said second port to said input of said frequency multiplier, and filter means for removing unwanted frequencies from the output of said frequency multiplier, the output of said filter being adapted to be coupled to the local oscillator input of said mixer, said frequency selective T including means for isolating relatively high frequencies appearing at said first port from said third port and for isolating relatively low frequency signals appearing at said third port from said second port.

5. The apparatus of claim 4 wherein said filter means comprises a wave guide coupled to said frequency multiplier, said wave guide having dimensions beyond cut-off for all frequencies below the desired multiplied local oscillator signal from said frequency multiplier.

6. The apparatus of claim 5 wherein said frequency multiplier comprises a coaxial transmission line, and diode means coupled between the center conductor and outer conductor of said coaxial transmission line, said diodes being effective to generate harmonics of the fundamental local oscillator signal, said center conductor extending into said wave guide to thereby comprise a coaxial-to-wave guide coupling.

7. The apparatus of claim 4 wherein said frequency selective T comprises a coaxial transmission line having first and second center conductor, one end of said first center conductor being journaled within one end of said second center conductor, means for insulating said first center conductor from said second center conductor to prevent the passage of direct current therebetween, a first coaxial connector means coupled to one end of said coaxial transmission line at the other end of said first center conductor, said first coaxial connector comprising said first port, a second coaxial connector coupled to said transmission line and comprising said third port, said second coaxial connector having a center pin, coupling means for coupling the center pin of said second coaxial connector to said first center conductor intermediate the ends thereof, said coupling means including capacitance means for preventing the coupling of said relatively high frequency between said transmission line and said second coaxial connector, and low frequency choke means associated with said second center conductor for preventing the transmission of said relatively low frequency signals to the other end of said coaxial transmission line, the said other end of said coaxial transmission line comprising said second port.

8. The apparatus of claim 7 wherein said frequency multiplier means comprises unidirectional conducting means coupled to said second center conductor for generating harmonics of the relatively high frequency signal propagating within said coaxial transmission line and further wherein said filter means comprises a wave guide having dimensions beyond cut-off for frequencies below the desired harmonic, said second center conductor extending into said wave guide to constitute a coaxial-to-wave guide coupling.

References Cited

UNITED STATES PATENTS 2,616,037 10/1952 Wheeler ---------- 250—20
2,852,671 9/1958 Cohen ------------- 50—36

ROBERT L. GRIFFIN, Primary Examiner

K. W. WEINSTEIN, Assistant Examiner

U.S. Cl. X.R.

325—351, 442